United States Patent
Schierz

(10) Patent No.: US 7,854,981 B2
(45) Date of Patent: Dec. 21, 2010

(54) MOUNTING MAT FOR MOUNTING AN EXHAUST GAS CATALYTIC CONVERTER

(75) Inventor: Claus Schierz, Freiberg (DE)

(73) Assignee: Langendorf Textil GmbH & Co. KG, Marktrodach (DE)

( * ) Notice: Subject to any disclaimer, the term of this patent is extended or adjusted under 35 U.S.C. 154(b) by 358 days.

(21) Appl. No.: 12/085,281

(22) PCT Filed: Nov. 11, 2006

(86) PCT No.: PCT/EP2006/010836

§ 371 (c)(1),
(2), (4) Date: May 20, 2008

(87) PCT Pub. No.: WO2007/059869

PCT Pub. Date: May 31, 2007

(65) Prior Publication Data

US 2009/0169801 A1 Jul. 2, 2009

(30) Foreign Application Priority Data

Nov. 28, 2005 (DE) .................. 20 2005 018 611 U

(51) Int. Cl.
*B32B 5/08* (2006.01)
*F01N 3/28* (2006.01)

(52) U.S. Cl. .................. 428/102; 442/352; 442/377; 442/391

(58) Field of Classification Search .................. 428/102, 428/192, 369; 442/352, 377, 391
See application file for complete search history.

(56) References Cited

U.S. PATENT DOCUMENTS

| 3,876,384 A | 4/1975 | Santiago et al. |
| 5,028,397 A | 7/1991 | Merry |
| 6,756,107 B1 * | 6/2004 | Schierz et al. .............. 428/192 |

FOREIGN PATENT DOCUMENTS

| DE | 80 19 813 | 10/1980 |
| DE | 199 32 255 | 1/2001 |
| EP | 0 319 299 | 6/1989 |
| WO | WO 01/00304 | 1/2001 |

OTHER PUBLICATIONS

International Search Report.

* cited by examiner

*Primary Examiner*—Alexander Thomas
(74) *Attorney, Agent, or Firm*—Collard & Roe, P.C.

(57) ABSTRACT

The invention relates to a mounting mat for mounting an exhaust gas catalytic converter, which is used for purifying motor vehicle exhaust gases, in a catalytic converter housing. The mounting mat has at least three plies and is mechanically compacted by seams (6) that absorb tensile stresses. The seams (6) are made with a sewing thread (7) whose temperature resistance is lower than the temperature of the mounting mat (5) when the exhaust gas catalytic converter is in operation. According to the invention, an elastically compressible nonwoven (3) made of crimped metal filaments is placed between two outer plies (1, 1') made of mineral fibers (2).

6 Claims, 1 Drawing Sheet

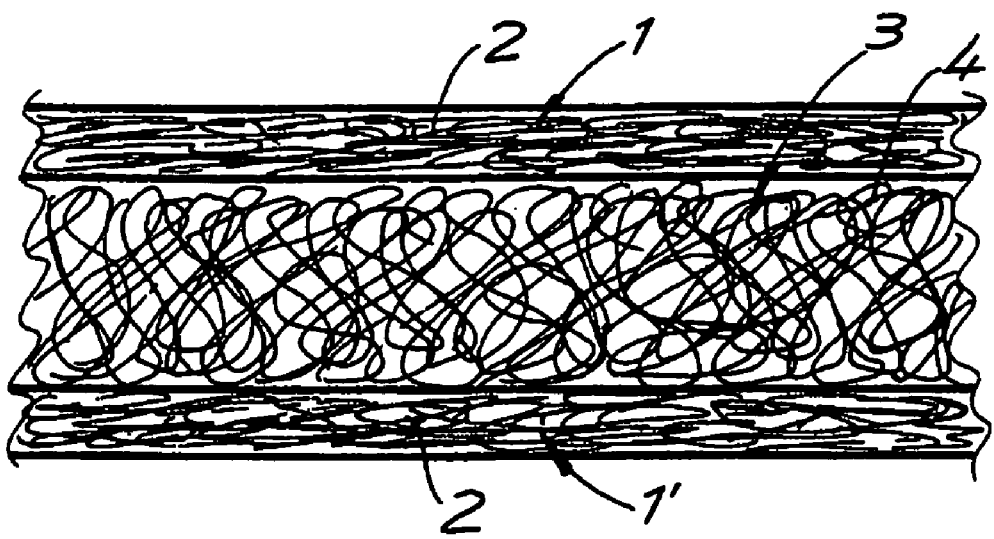
_Fig.1_
_Fig.2_
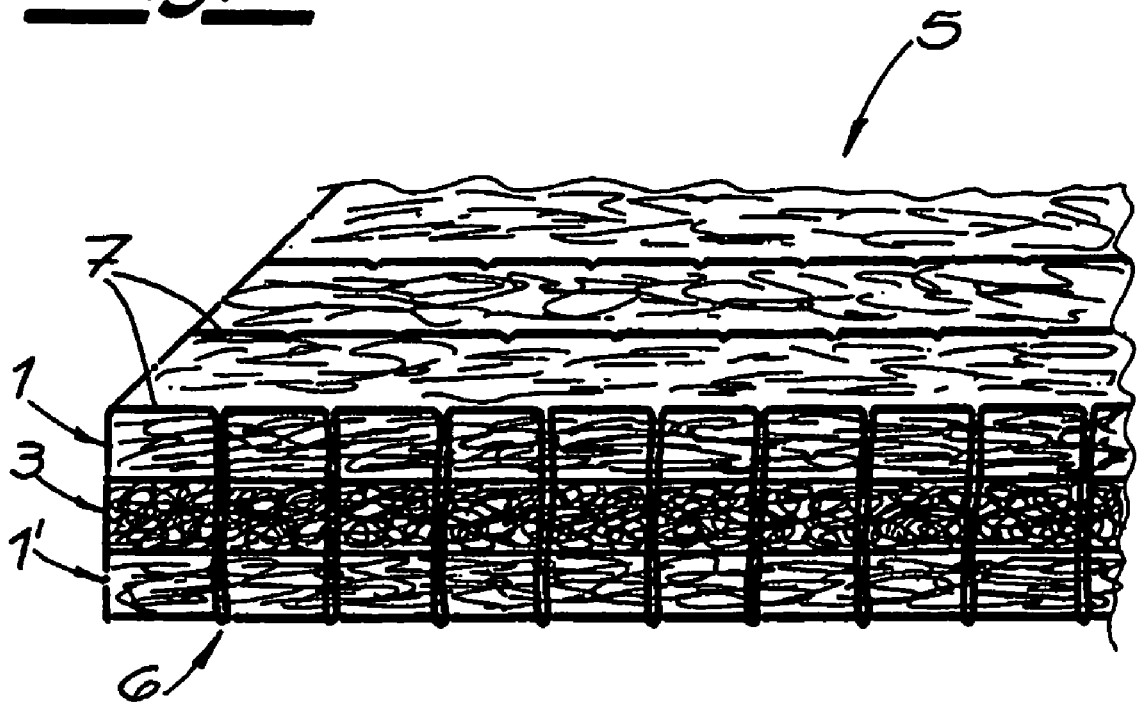

MOUNTING MAT FOR MOUNTING AN EXHAUST GAS CATALYTIC CONVERTER

CROSS REFERENCE TO RELATED APPLICATIONS

This application is the National Stage of PCT/EP2006/010836 filed on Nov. 11, 2006, which claims priority under 35 U.S.C. §119 of German Application No. 20 2005 018 611.2 filed on Nov. 28, 2005. The international application under PCT article 21(2) was not published in English.

The invention relates to a mounting mat for mounting an exhaust gas catalytic converter, which is used for cleaning motor vehicle exhaust gases, in a catalytic converter housing, wherein the mounting mat comprises at least three layers and is mechanically compacted by seams accepting tensile stresses, wherein the seams are executed with a sewing thread having a temperature resistance lower than the temperature of the mounting mat during operation of the exhaust gas catalytic converter. The mounting mat is arranged at the circumference of an exhaust gas catalytic converter and seals the annular gap between exhaust gas catalytic converter and catalytic converter housing. The mounting mat compressed and mechanically solidified by seams can be easily mounted. On initial operation of the catalytic converter the arrangement heats up, wherein the sewing threads consisting of non-temperature-resistant material thermally disintegrate and the mounting mat thereupon radially expands.

A mounting mat with the features described in the introduction is known from the specification DE 199 32 255 A1. The known mounting mat is an area body, which is free of binder, consisting of mineral fibres which are mechanically solidified by quilting seams. As mineral fibres use is made of endless threads of a staple fibre roving, which are fixed under tensile stress by the quilting seams in the area body. After thermal disintegration of the sewing threads, which are not temperature resistant, the mounting mat expands due to liberation of the deformation energy stored in the staple fibre roving. An expensive production method for manufacture of the mounting mat is necessary in order to fix the mineral fibres under tensile stress in the area body. In addition, the expansion action of the mounting mat is still in need of improvement.

Against this background the invention has the object of indicating a mounting mat for an exhaust gas catalytic converter which has a large capability of expansion which is liberated with placing the exhaust gas catalytic converter into operation and also does not change over longer periods of time.

According to the invention the object is fulfilled in that a resiliently compressible non-woven material of crinkled metal filaments is arranged between two outer layers of mineral fibres.

The metal filaments are preferably endless filaments produced by cutting up. For example, they can be pared from a metal rod whereby very strongly crinkled endless filaments form. The metal filaments consist of, for example, steel, wherein alloyed stainless steels are preferred.

The expansion of the mounting mat after thermal disintegration of the sewing threads is based particularly on the expansion of the non-woven material consisting of metal filaments. The high resilience of this layer can be released in order to hold an exhaust gas catalytic converter permanently and reliably in the catalytic converter housing. In addition, larger gaps between exhaust gas catalytic converter and catalytic converter housing can be reliably bridged over.

Silicate fibres, in particular, are suitable as mineral fibres of the outer layers. However, the mineral fibres can, without restriction, also have a high proportion of $AL_2O_3$ or be made of another ceramic material. Within the scope of the invention use can be made, without restriction, of short staple fibres, filaments and/or comminuted filaments, for example of $SiO_2$, as mineral fibres in the outer layers.

The seams necessary for the mechanical solidification of the mounting mat can be executed as quilting seams. In order to ensure a uniform compression and a substantially constant thickness of the mounting mat the seams are advantageously arranged at a spacing of less than 10 millimetres, preferably less than 5 millimetres.

According to a preferred embodiment of the invention the mounting mat consists of three layers, wherein the thickness ratio of the uncompressed layers determinable after thermal disintegration of the sewing threads lies between 1:1:1 and 1:5:1. The compression, which is produced by means of the sewing threads, of the mounting mat is preferably substantially or completely reversible, wherein kinking of the metal filaments, which are used in the middle layer, due to excessive compression and a concomitant loss of elastic characteristics are to be avoided.

The thickness of the mounting mat is, for example, dependent on the production tolerances and the dimensions of exhaust gas catalytic converter and catalytic converter housing. The thickness of the mounting mat typically lies in a range between 3 millimetres and 10 millimetres. After thermal disintegration of the sewing threads the mounting mat then has as a consequence of the restoring force of the non-woven material consisting of metal filaments a thickness corresponding with at least twice the value of the initial thickness.

Due to the mechanical compaction produced by means of the sewing threads the mounting mat can be readily mounted. When the catalytic converter is first placed in operation the arrangement heats up, wherein the sewing threads consisting of material which is not temperature resistant are destroyed. Suitable as material for the sewing threads are, for example, synthetic material filaments or yarns of synthetic material fibres which are destroyed from a temperature of approximately 250° C. by carbonisation. Since the expansion of the mounting mat is ensured particularly by the resiliently compressible non-woven material of crinkled metal filaments the mineral fibres of the outer layers can be selected from other aspects. In particular, in the case of use of staple fibres the longevity of the mounted mounting mat can be improved by a temperature-resistant seam which encircles the edge of the mounting mat and prevents loosening of individual fibres from the mounting mat.

The invention is explained in the following by way of a drawing which illustrates merely an example of embodiment and in which:

FIG. 1 schematically shows the layers, from which the mounting mat is constructed, in an uncompressed state and FIG. 2 schematically shows a perspective sectional illustration through a mounting mat according to the invention.

According to the illustration in FIG. 1 a resiliently compressible non-woven material 3 of crinkled metal filaments 4 is arranged between two outer layers 1, 1' of mineral fibres 2. The metal filaments 4 are strongly crinkled endless filaments, which can be produced by cutting, for example by paring from a metal rod. Steels, particularly alloyed corrosion-resistant steels, for example come into consideration as material. The non-woven material 3 consisting of metal filaments has a large range of elasticity in which it is resiliently compressible substantially reversibly and without kinking of the metal filaments. The outer layers 1, 1', thereagainst, are substantially non-elastic and consist of, for example, silicate fibres.

The thickness ratio of the uncompressed layers lies between 1:1:1 and 1:5:1. In the example of embodiment the non-woven material consisting of crinkled metal filaments has in the uncompressed state a thickness of approximately 10 millimetres, whereas the outer layers are, for example, approximately 3 millimetres thick.

A mounting mat constructed from the layers illustrated in FIG. 1 is illustrated in FIG. 2. The layers are mechanically compacted by seams 6 which accept tensile stress and which are executed as quilting seams. For the seams 6 use is made of a sewing thread 7 having a temperature resistance lower than the temperature of the mounting mat in operation of the exhaust gas catalytic converter. Usable as sewing threads 7 are, for example, synthetic material filaments or yarns of synthetic material fibres which are destroyed by carbonisation at a temperature of 250° C. The quilting seams are arranged at a spacing of less than 10 millimetres, preferably less than 5 millimetres, whereby a uniform compression and a constant thickness of the mounting mat is guaranteed.

The mounting mat 5 compacted by sewing threads has in the example of embodiment a thickness between 3 millimetres and 10 millimetres. After thermal disintegration of the sewing threads the mounting mat radially expands and in the uncompressed state adopts a thickness which corresponds with at least twice the value of the initial thickness.

In the example of embodiment it has been additionally indicated that the mounting mat can have at its edge an encircling temperature-resistant seam of a metal thread which permanently prevents detaching or fraying of individual metal fibres at the edge of the mounting mat.

The invention claimed is:

1. Mounting mat for mounting an exhaust gas catalytic converter, which is used for cleaning motor vehicle exhaust gases, in a catalytic converter housing, the mounting mat comprising at least three layers mechanically compacted by seams accepting tensile stresses, wherein the seams are executed with a sewing thread having a temperature resistance lower than the temperature of the mounting mat during operation of the exhaust gas catalytic converter, wherein a resiliently compressible non-woven material of crinkled metal filaments is arranged between two outer layers of mineral fibers.

2. Mounting mat according to claim 1, wherein the metal filaments are continuous filaments.

3. Mounting mat according to claim 1, wherein the mineral fibers of the outer layers are silicate fibers.

4. Mounting mat according to claim 1, wherein the seams are executed as quilting seams and arranged at a spacing of less than 10 millimeters.

5. Mounting mat according to claim 1, wherein the mounting mat consists of three layers, wherein the thickness ratio of the uncompressed layers determinable after thermal disintegration of the sewing threads lies between 1:1:1 and 1:5:1.

6. Mounting mat according to claim 1, wherein the mounting mat compacted by sewing threads has a thickness between 3 millimeters and 10 millimeters and after thermal disintegration of the sewing threads has as a consequence of the restoring force of the non-woven material consisting of metal filaments a thickness corresponding with at least twice the value of the initial thickness.

\* \* \* \* \*